(12) United States Patent
Hsieh et al.

(10) Patent No.: US 8,897,589 B2
(45) Date of Patent: Nov. 25, 2014

(54) METHOD OF DETECTING SUBJECT OF IMAGE AND IMAGING DEVICE THEREOF

(71) Applicant: Altek Semiconductor Corporation, Hsinchu (TW)

(72) Inventors: Chia-Chun Hsieh, Kaohsiung (TW); Wen-Yan Chang, Zhunan Township, Miaoli County (TW); Hong-Long Chou, Taipei (TW)

(73) Assignee: Altek Semiconductors Corporation, Hsinchu (TW)

( * ) Notice: Subject to any disclaimer, the term of this patent is extended or adjusted under 35 U.S.C. 154(b) by 151 days.

(21) Appl. No.: 13/785,332

(22) Filed: Mar. 5, 2013

(65) Prior Publication Data

US 2014/0192215 A1      Jul. 10, 2014

(30) Foreign Application Priority Data

Jan. 8, 2013   (TW) .............................. 102100491 U

(51) Int. Cl.
*G06K 9/40* (2006.01)
*H04N 5/232* (2006.01)

(52) U.S. Cl.
CPC ................................. *H04N 5/23212* (2013.01)
USPC ......................................................... 382/255

(58) Field of Classification Search
USPC ........ 382/117, 118, 190, 199, 255; 348/222.1
See application file for complete search history.

(56) References Cited

U.S. PATENT DOCUMENTS 7,751,613 B2 *   7/2010   Chou et al. .................... 382/154

\* cited by examiner

*Primary Examiner* — Duy M Dang
(74) *Attorney, Agent, or Firm* — Muncy, Geissler, Olds & Lowe, P.C.

(57) ABSTRACT

A method of detecting the subject of an image and imaging device thereof are disclosed. The method comprises the following steps of providing an image capturing module to capture the temporal image, providing the image processing module to receive the temporal image and to determine a plurality of objects from the temporal image, using the image processing module to define a plurality of regions on the temporal image based on the center of temporal image, using the image processing module to assign an initial setup value to each of the objects according to the region corresponding to each of the objects, using the imaging processing module to execute an operation to increase or decrease each of the initial setup values, using the image processing module to execute a sorting, and selecting at least one of the objects as a subject of the temporal image.

12 Claims, 13 Drawing Sheets

METHOD OF DETECTING SUBJECT OF IMAGE AND IMAGING DEVICE THEREOF

CROSS-REFERENCE TO RELATED APPLICATION

This application claims priority from Taiwan Patent Application No. 102100491, filed Jan. 8, 2013, the contents of which are hereby incorporated by reference in their entirety for all purposes.

BACKGROUND OF THE INVENTION

1. Field of the Invention

The present invention relates to a method of detecting the subject of an image and imaging device thereof, and particularly, to an imaging device and a method of detecting the subject of an image to obtain the subject of objects in an image.

2. Description of the Related Art

With advent of the digital era and the vigorous developments of the related software and hardware, various digital mobile apparatuses already gain the identification of people and are widely applied to daily life. Imaging capturing devices such as digital cameras and digital camcorders both provide users with a more convenient life style.

However, traditional cameras cannot detect the subject of an image, but rely on a user to direct the focusing direction to photograph. Therefore, if a user does not direct the focusing direction precisely such that the desired object is not located on the center of the picture, but only on the boundary, the image of the desired object on the picture taken by the user must be blurring.

SUMMARY OF THE INVENTION

Based on the problems of the prior arts, the purpose of the present invention is to provide a method of detecting the subject of an image to obtain the subject of objects in an image and imaging device thereof to solve the problem of blurring pictures. This problem happens when a user is handling a traditional camera and does not direct the focusing direction precisely such that the desired object is not located on the center of the picture, but only on the boundary, the image of the desired object on the picture taken by the user must be blurring.

According to the purpose of the present invention, the present invention provides a method of detecting the subject of an image, comprising the follow steps: providing an image capturing module to capture a temporal image; providing an image processing module to receive the temporal image and decide a plurality of objects from the temporal image; using the image processing module to define a plurality of regions on the temporal image based on a center of the temporal image; using the image processing module to assign an initial setup value to each of the objects according to the region corresponding to each of the objects; using the image processing module to execute an operation to each of the objects to increase or decrease each of the initial setup values; using the image processing module to execute a sorting based on each of the initial setup values which have already modified by the operation; and selecting at least one of the objects as a subject of the temporal image based on each of the initial setup values after the sorting.

According to the object of this invention, the present invention provides an imaging device, comprising an image capturing module, an image processing module, and a function operation module. The image capturing module is to capture a temporal image. The imaging processing module is to receive the temporal image, to decide a plurality of objects from the temporal image, to define a plurality of regions on the temporal image based on a center of the temporal image, to assign an initial setup value to each of the objects according to the region corresponding to each of the objects, to execute an operation to each of the objects to increase or decrease each of the initial setup values, to execute a sorting based on each of the initial setup values which have already modified by the operation, to select at least one of the objects as a subject of the temporal image based on each of the initial setup values after the sorting. The function operation module is to execute a function operation of the imaging device based on the subject, wherein the function operation at least comprises a focusing operation.

As above-mentioned, the method of detecting the subject of an image and imaging device thereof of the present invention may have one or more characteristics and advantages as described below:

(1) The method of detecting the subject of an image and imaging device thereof of the present invention can use the subject to detect the objects of an image to make a user more convenient when taking a picture.

(2) The method of detecting the subject of an image and imaging device thereof of the present invention can use the subject to detect the objects of an image to increase the image quality of the pictures taken.

(3) The method of detecting the subject of an image and imaging device thereof of the present invention can use the subject to detect the objects of an image to enable the user to select the desired objects to photograph in a picture.

DETAILED DESCRIPTION OF THE PREFERRED EMBODIMENTS

With reference to the drawings, thereafter, the preferred embodiments of the method of detecting subject of image and imaging device thereof in accordance with the present invention are illustrated. In order to be understood easily, the same components in the following embodiments are labeled as the same numeral.

Figure 1:
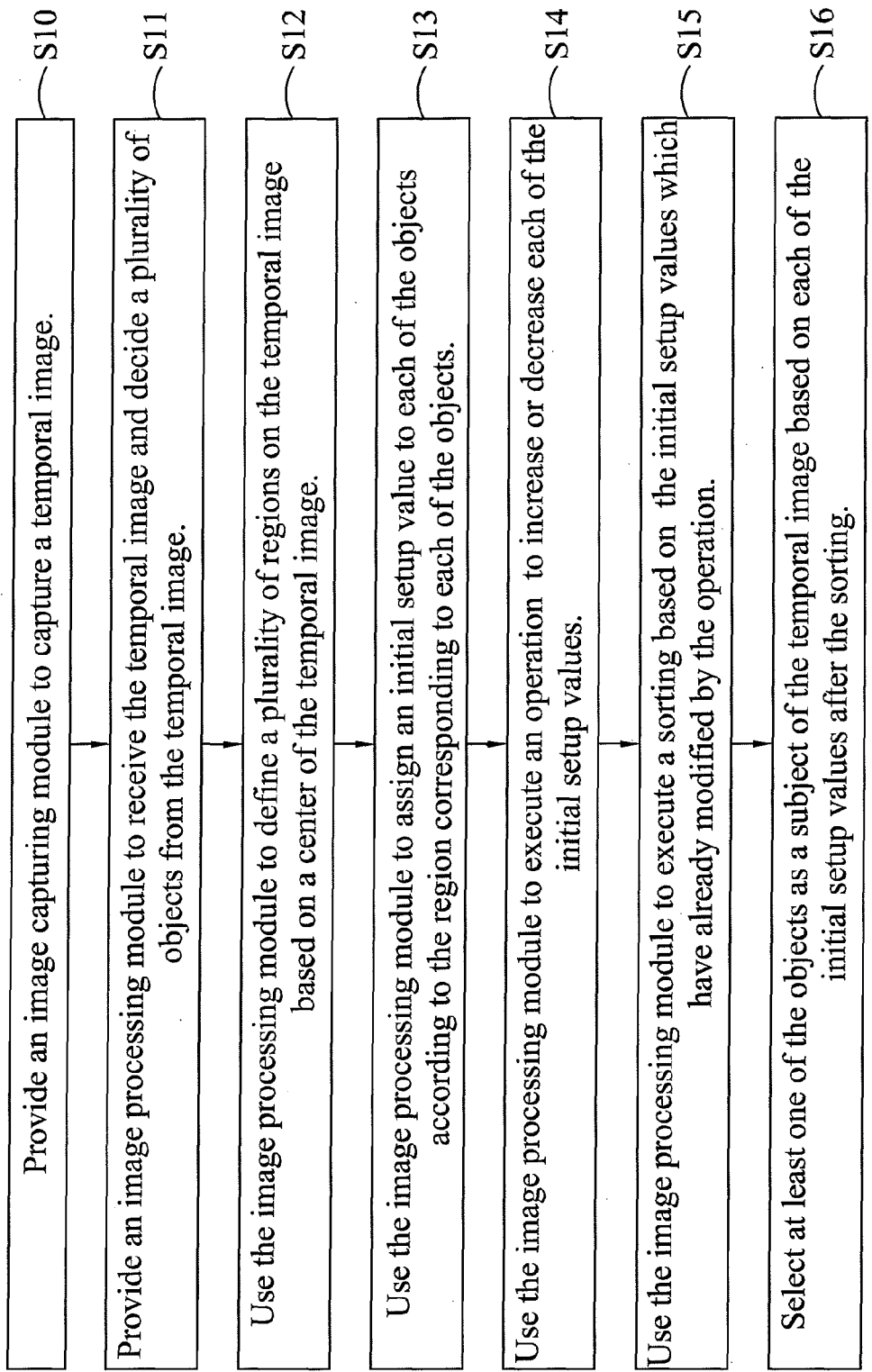
FIG. 1 is a first flow chart showing the method of detecting the subject of an image according to a first preferred embodiment of the present invention.
Figure 2:
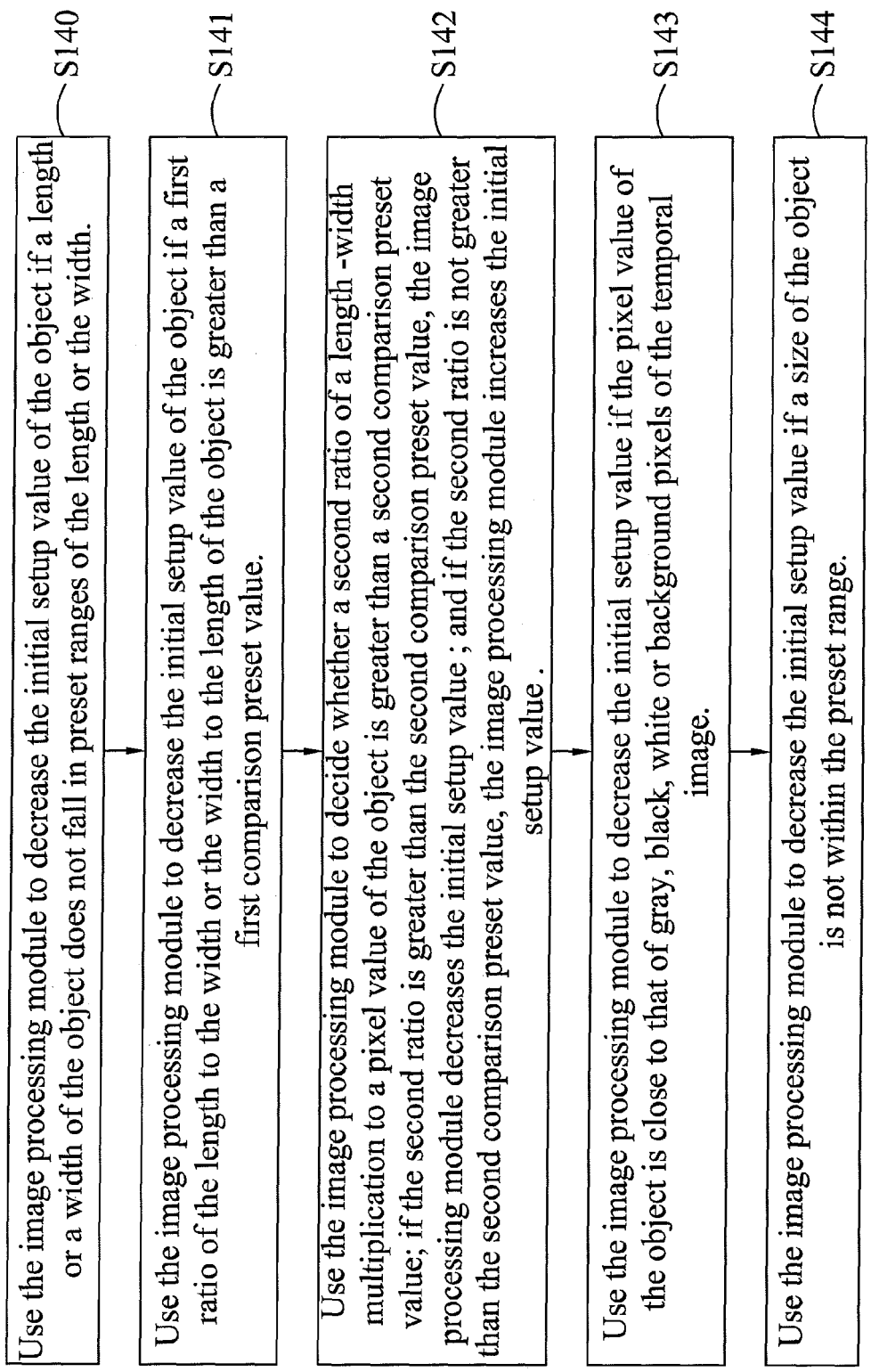
FIG. 2 is a second flow chart showing the method of detecting the subject of an image according to a first preferred embodiment of the present invention.
Figure 3A:
FIGS. 3a-3d are a first to a fourth schematic views showing the method of detecting the subject of an image according to a first preferred embodiment of the present invention.
Figure 3B:
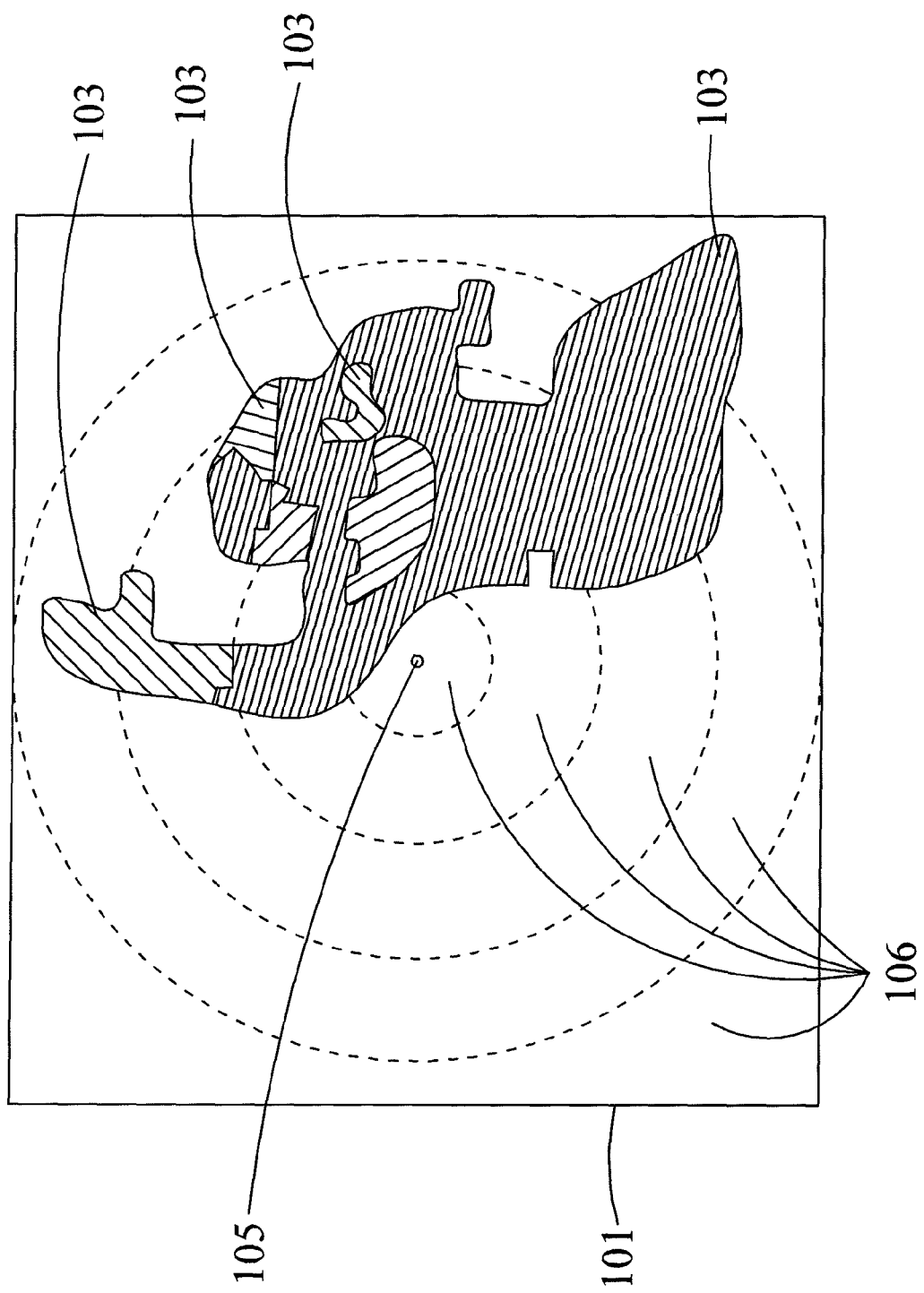
Figure 3C:
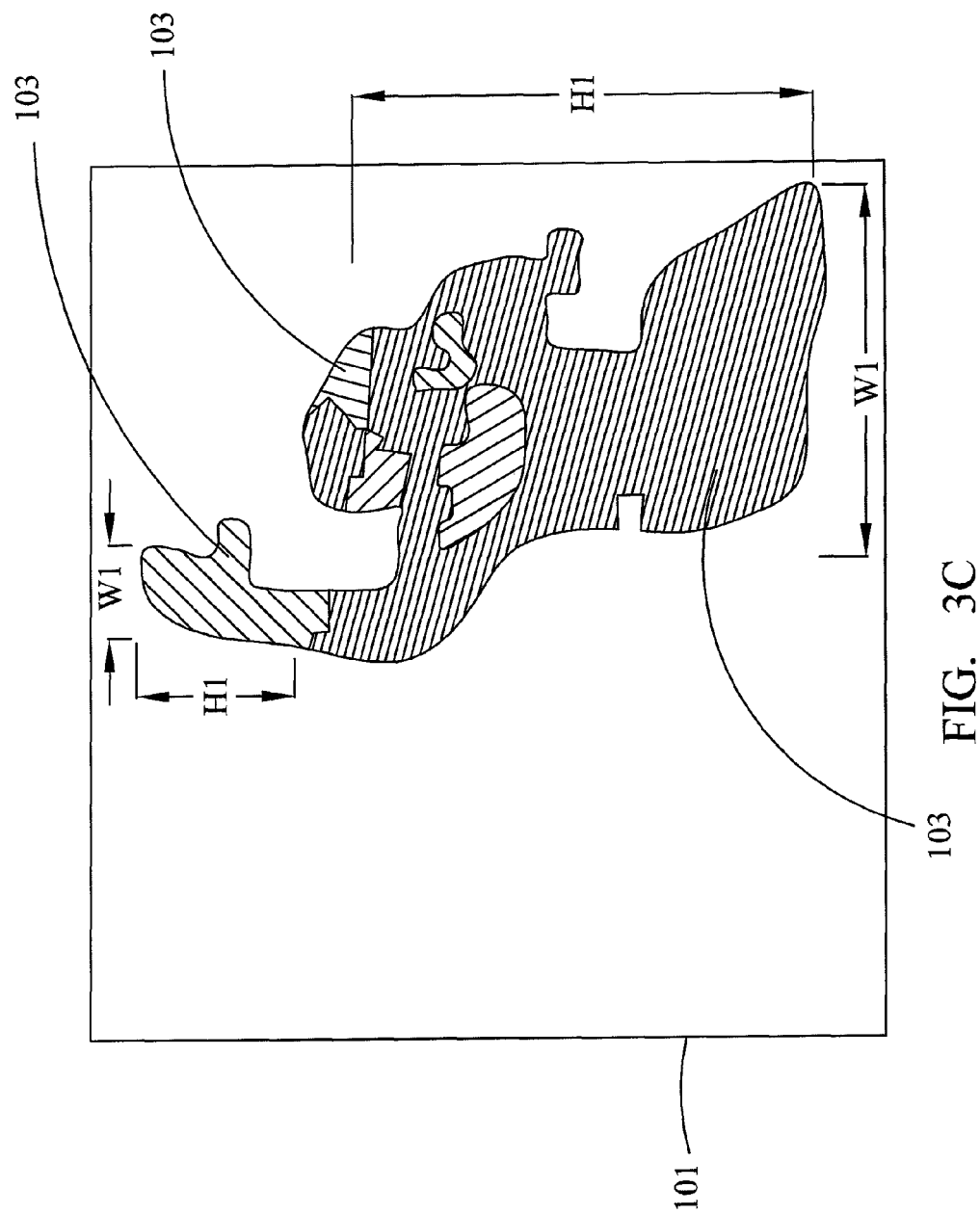
Figure 3D:
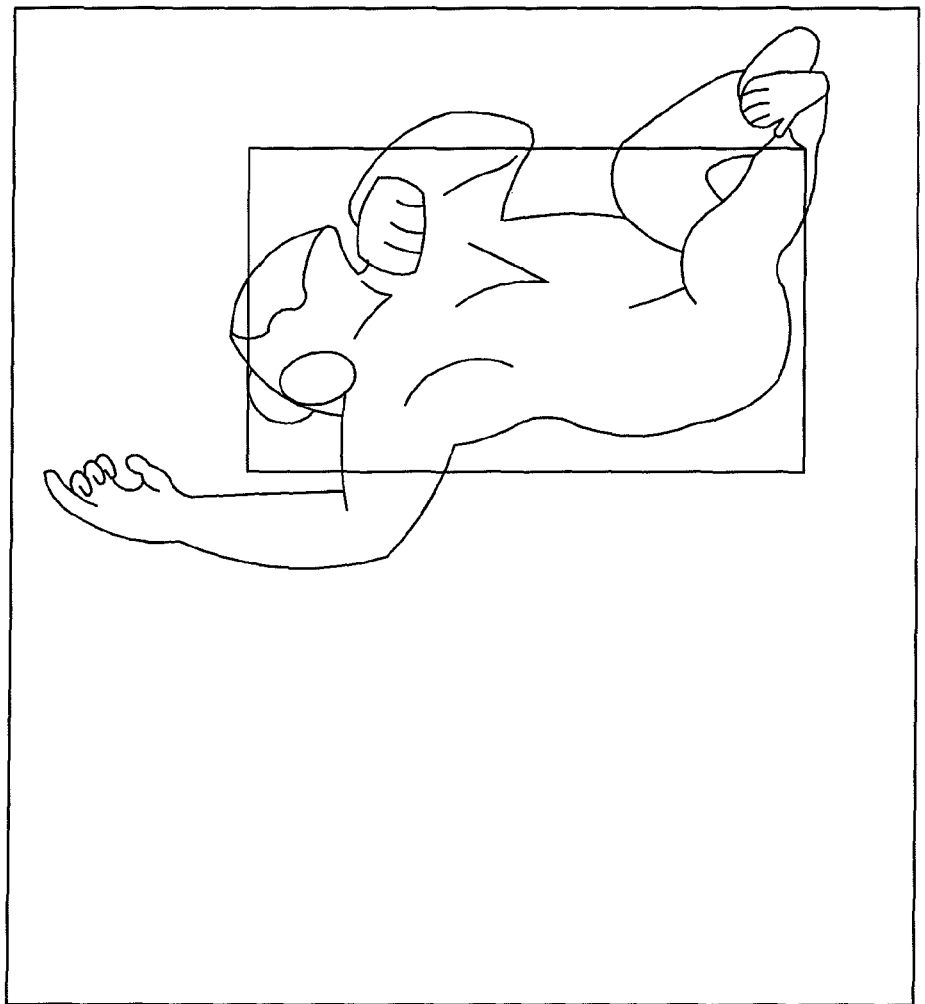
Figure 4:
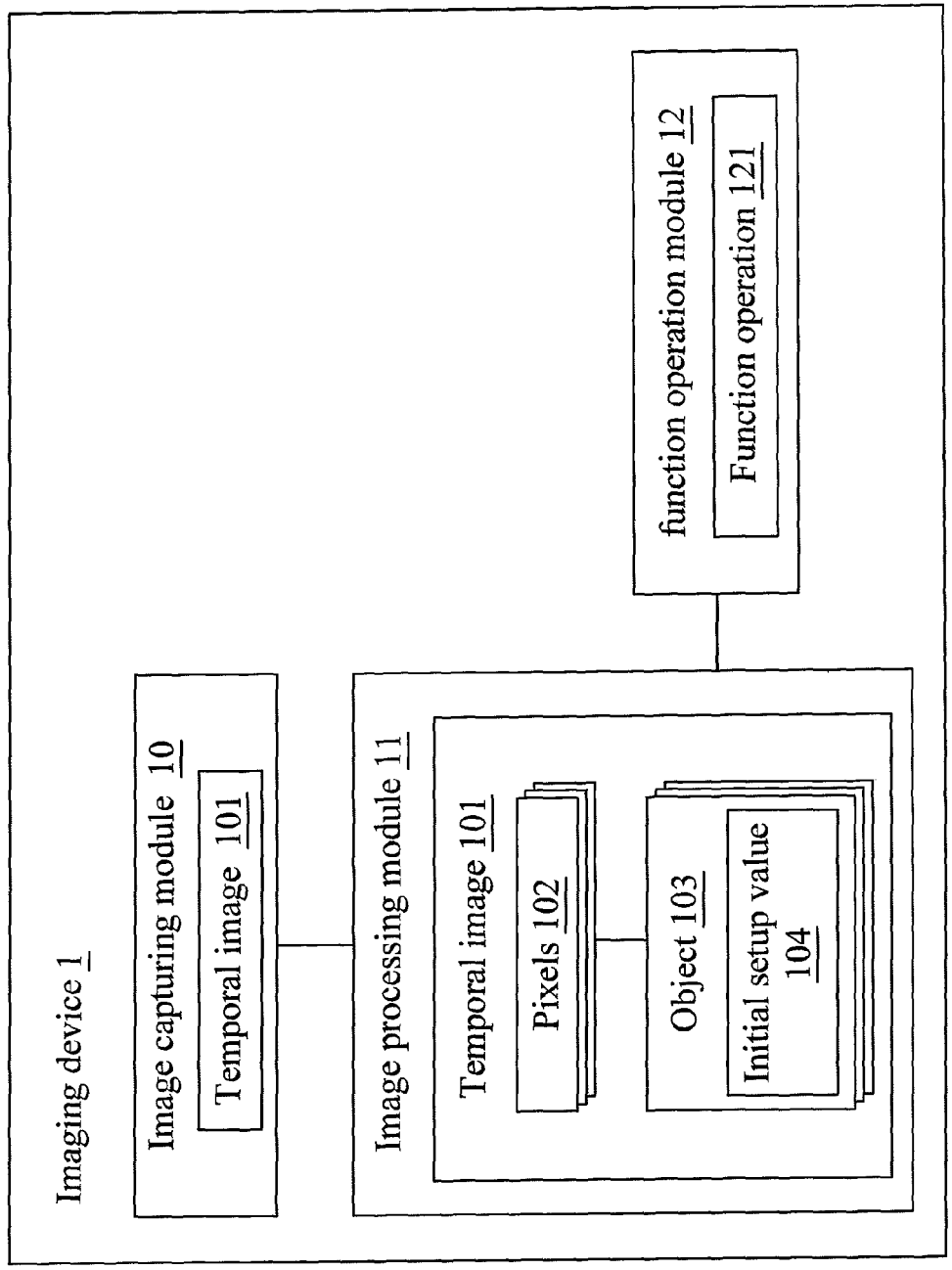
FIG. 4 is a block diagram showing the image device of detecting the subject of an image of the present invention.

Referring to FIGS. 1-4, in which FIGS. 1-4 are the first and the second flow charts, the first to the fourth schematic views, and the block diagram of the first preferred embodiment of the method of detecting subject of image and imaging device thereof of the present invention. As shown in the figures, the method of detecting subject of image and imaging device thereof is applied to a photographing device and comprises the following steps:

(S10): providing an image capturing module to capture a temporal image;

(S11): providing an image processing module to receive the temporal image and decide a plurality of objects from the temporal image;

(S12): using the image processing module to define a plurality of regions on the temporal image based on a center of the temporal image;

(S13): using the image processing module to assign an initial setup value to each of the objects according to the region corresponding to each of the objects;

(S14): using the image processing module to execute an operation to each of the objects to increase or decrease each of the initial setup values;

(S15): using the image processing module to execute a sorting based on each of the initial setup values which have already modified by the operation; and (S16): selecting at least one of the objects as a subject of the temporal image based on each of the initial setup values after the sorting.

In the above, the operation step over each of the objects further comprises the following steps:

(S140): using the image processing module to decrease the initial setup value of the object if a length H1 or a width W1 of the object does not fall in preset ranges of the length or the width;

(S141): using the image processing module to decrease the initial setup value of the object if a first ratio of the length H1 to the width W1 or the width W1 to the length H1 of the object is greater than a first comparison preset value;

(S142): using the image processing module to decide whether a second ratio of a length H1-width W1 multiplication to a pixel value of the object is greater than a second comparison preset value; if the second ratio is greater than the second comparison preset value, the image processing module decreases the initial setup value; and if the second ratio is not greater than the second comparison preset value, the image processing module increases the initial setup value;

(S143): using the image processing module to decrease the initial setup value if the pixel value of the object is close to that of gray, black, white or background pixels of the temporal image;

(S144): using the image processing module to decrease the initial setup value if a size of the object is not within the preset range.

Specifically, when an imaging device 1 is operated in preview, the image capturing module 10 first captures a temporal image 101 and delivers it to the image processing module 11. The image processing module 11 executes a color block division according to the colors of pixels contained in the temporal image 101, in order to obtain a plurality of color blocks, e.g., about ten color blocks. The plurality of color blocks are used to define a plurality of objects 103. Furthermore, the color block division is able to reduce the color blocks with different pixel colors contained in the temporal image 101 to about ten major color blocks. Thus, the subsequent steps need to process merely these ten blocks and are able to achieve fast processing and calculations. It is noted that the color block division is irrelevant to a specific color, for example, the color block division does not focus on skin color, blue color or green color. Afterward, the image processing module 11 uses the center 105 of the temporal image 101 as a reference to define a plurality of regions 106 from outside-in and assign an initial setup value 104 to each of the objects 103 based on the regions 106 the object 103 covers. For example, the initial setup value 104 is increasing or decreasing from outside to inside.

Afterward, the image processing module 11 implements the above operation steps (S140~S144) on each of the objects 103 to increase or decrease each of the initial setup values 104. Finally, the image processing module 11 executes the sorting of the objects 103 based on the results of the aforementioned operation steps, then commands a display module (not shown in the figure) to show the result of disposition. For example, the image processing module 11 displays a few (e.g., 3) objects 103 with the highest sorting results to the user for selection. When the user selects one of the objects 103 with the highest sorting results as the subject of the temporal image 101, a function operation module 12 can execute a function operation 121 over the photographing object corresponding to the subject. For example, if the subject is an object or scenery, the function operation module 12 uses this subject as the focus point to execute focusing, then proceeds to the image capturing of the photographing object. Besides, the selecting subject can also used in the subsequent auto exposure and the auto white balancing.

Figure 5:
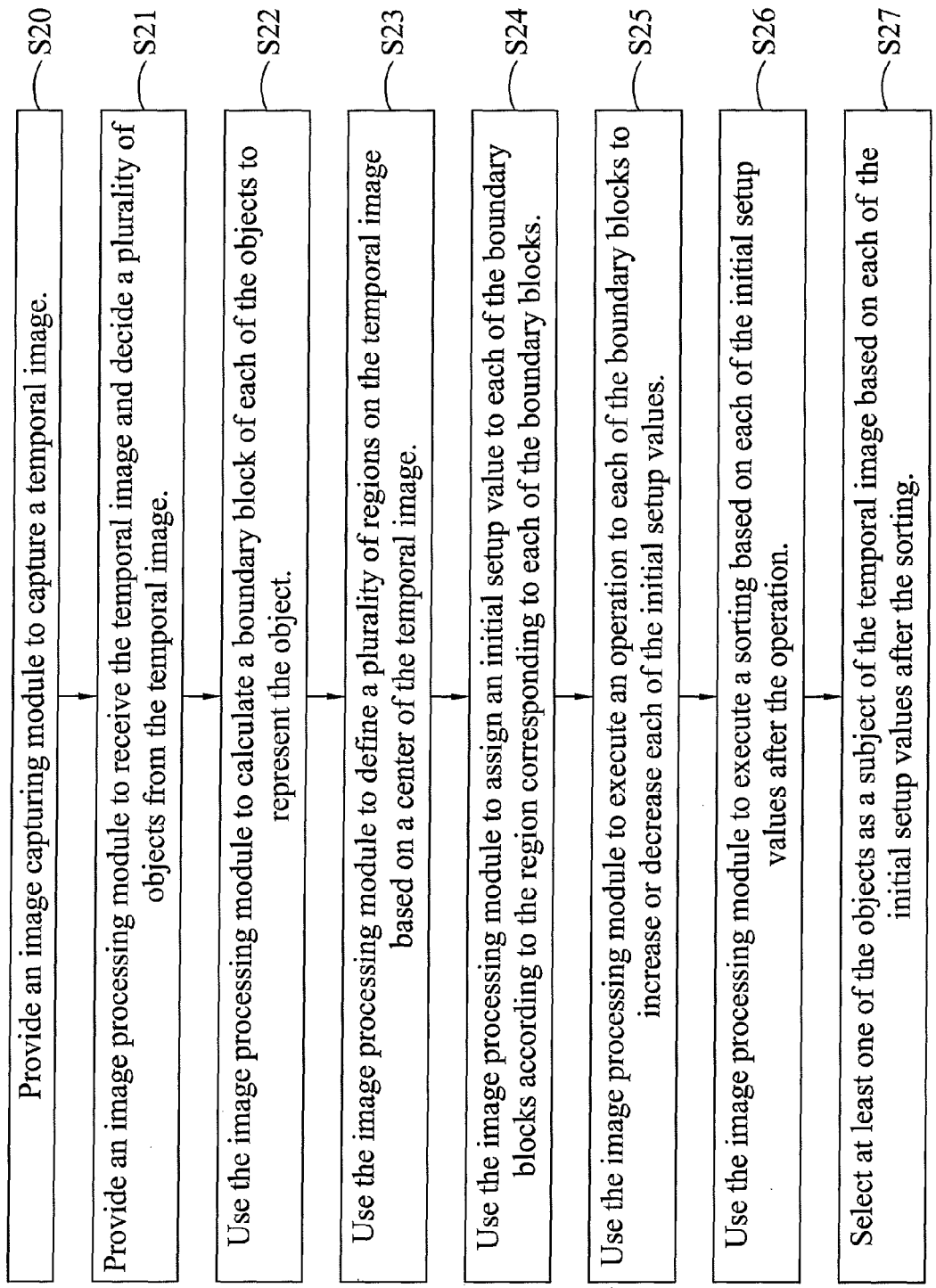
FIG. 5 is a first flow chart showing the method of detecting the subject of an image according to a second preferred embodiment of the present invention.
Figure 6:
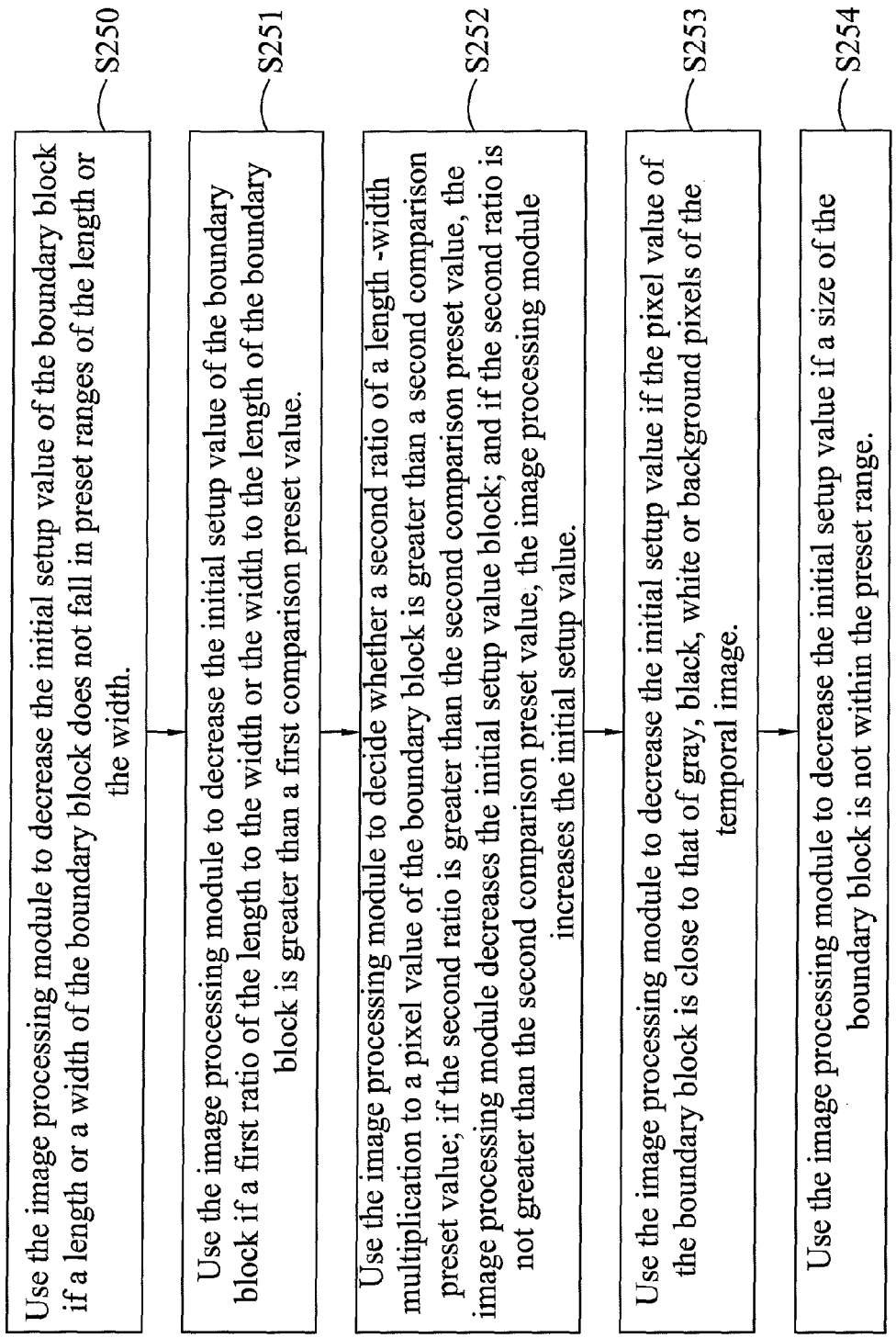
FIG. 6 is a second flow chart showing the method of detecting the subject of an image according to a second preferred embodiment of the present invention.
Figure 7A:
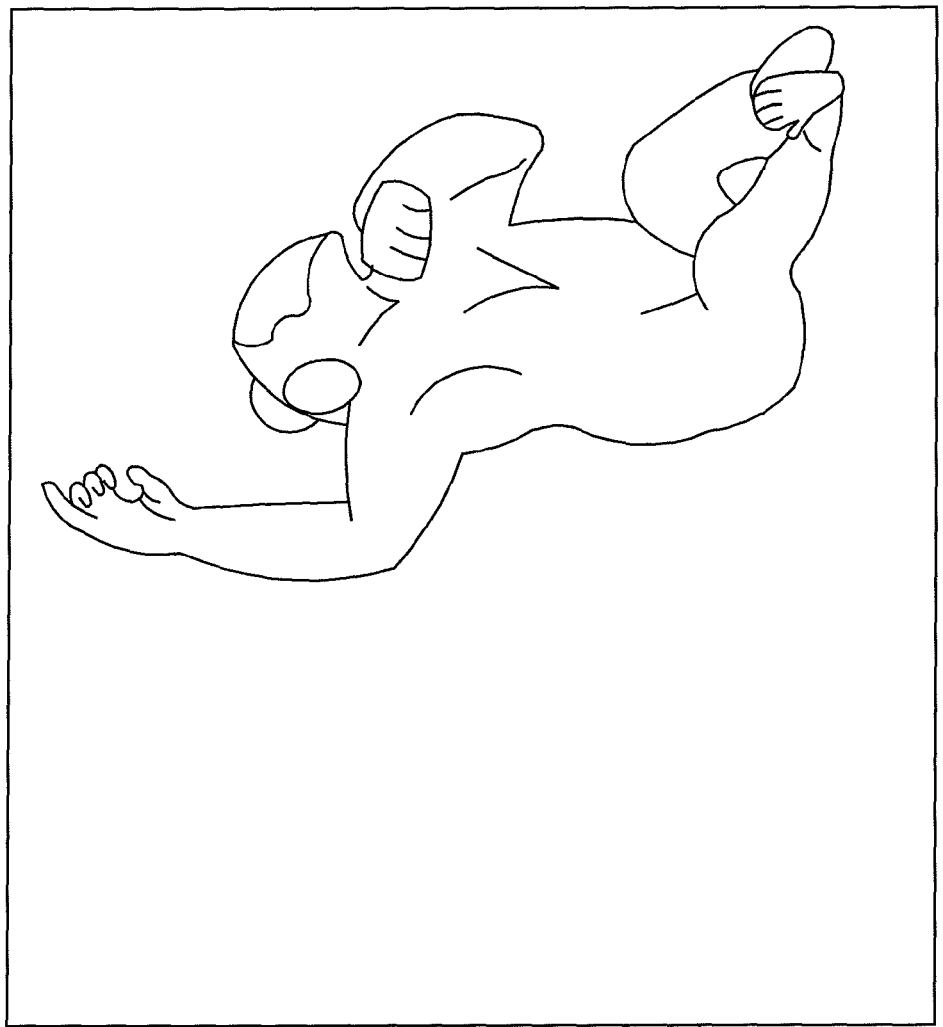
FIGS. 7a-7d are a first to a fourth schematic views showing the method of detecting the subject of an image according to a second preferred embodiment of the present invention.
Figure 7B:
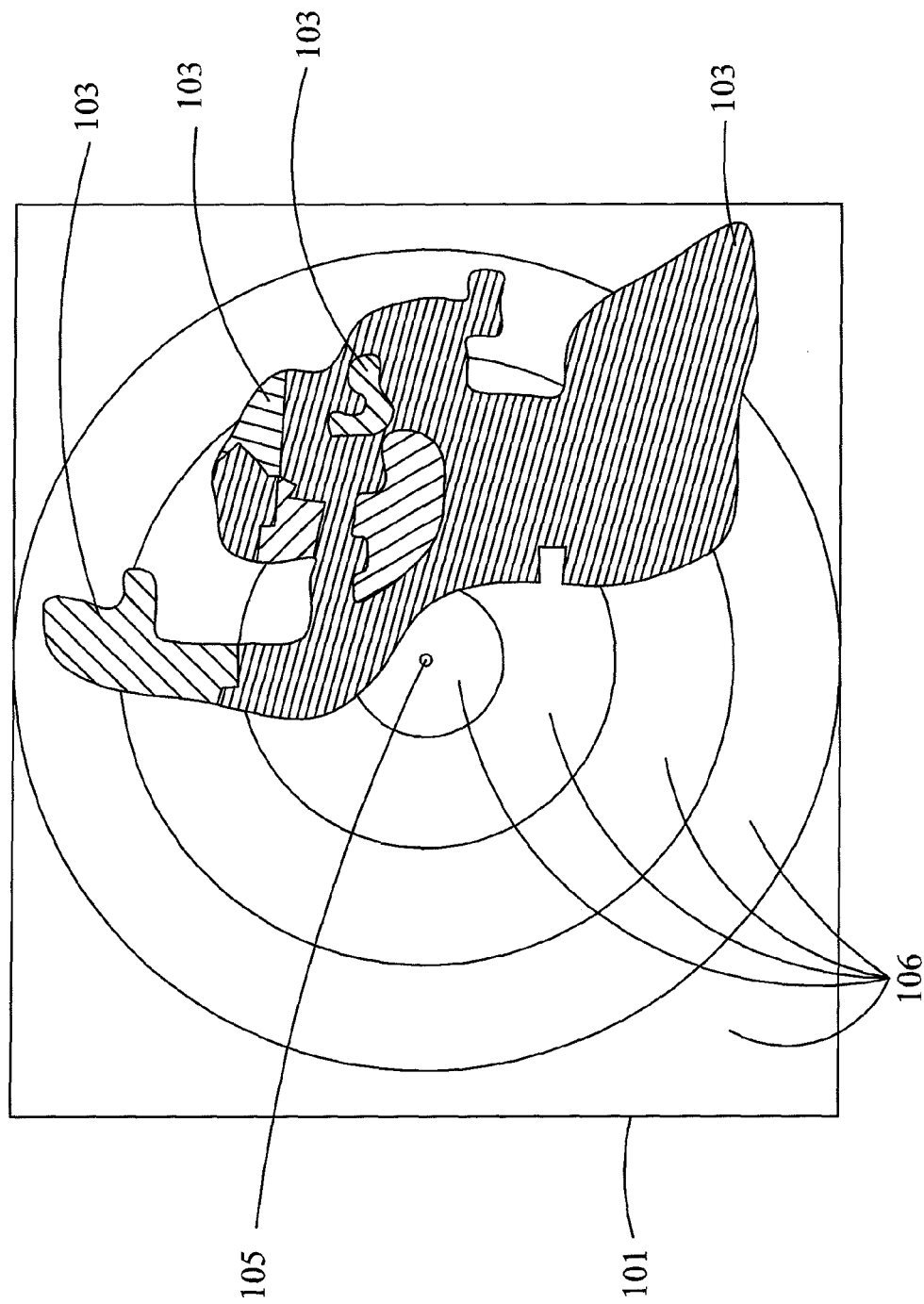
Figure 7C:
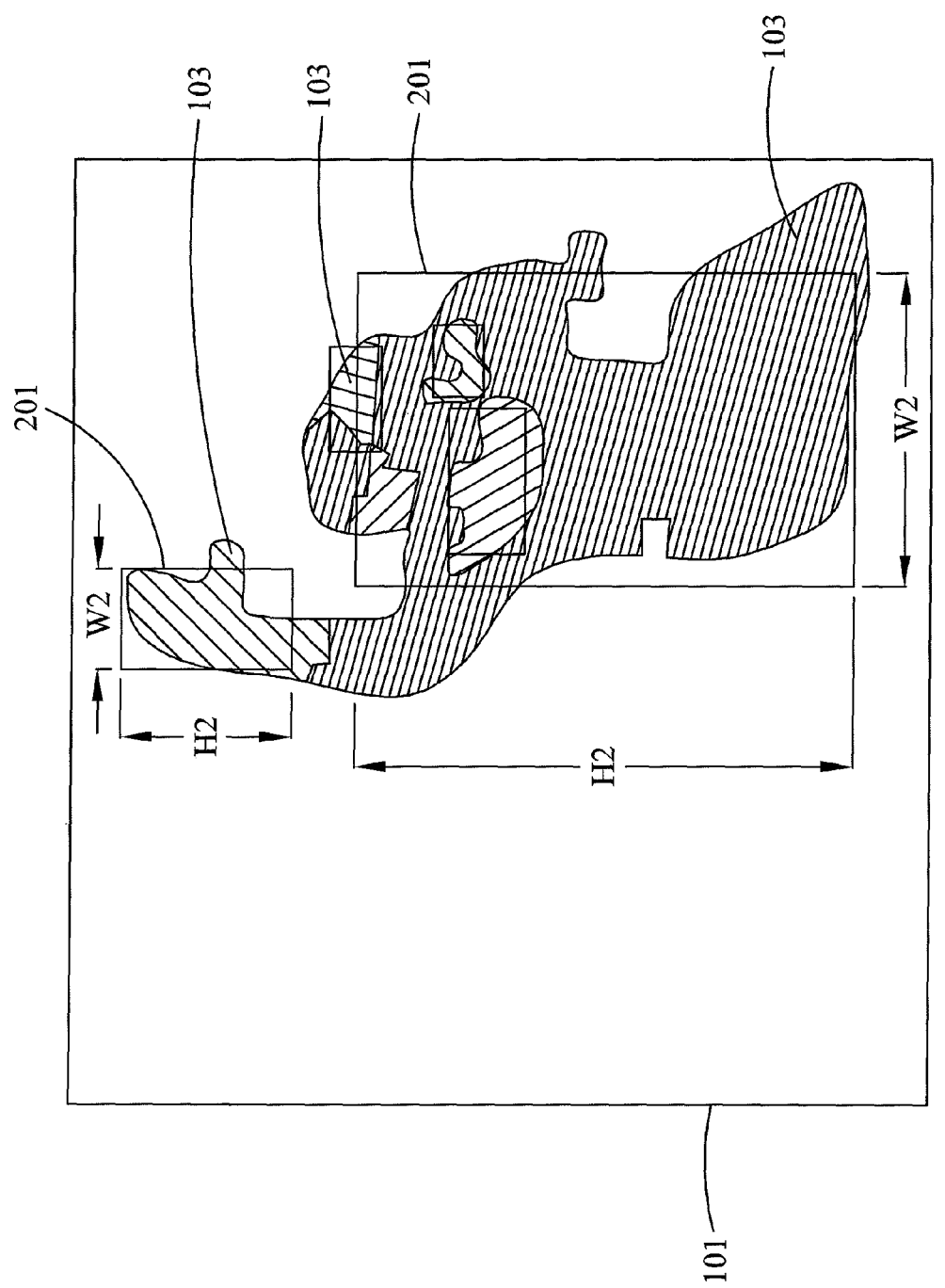
Figure 7D:
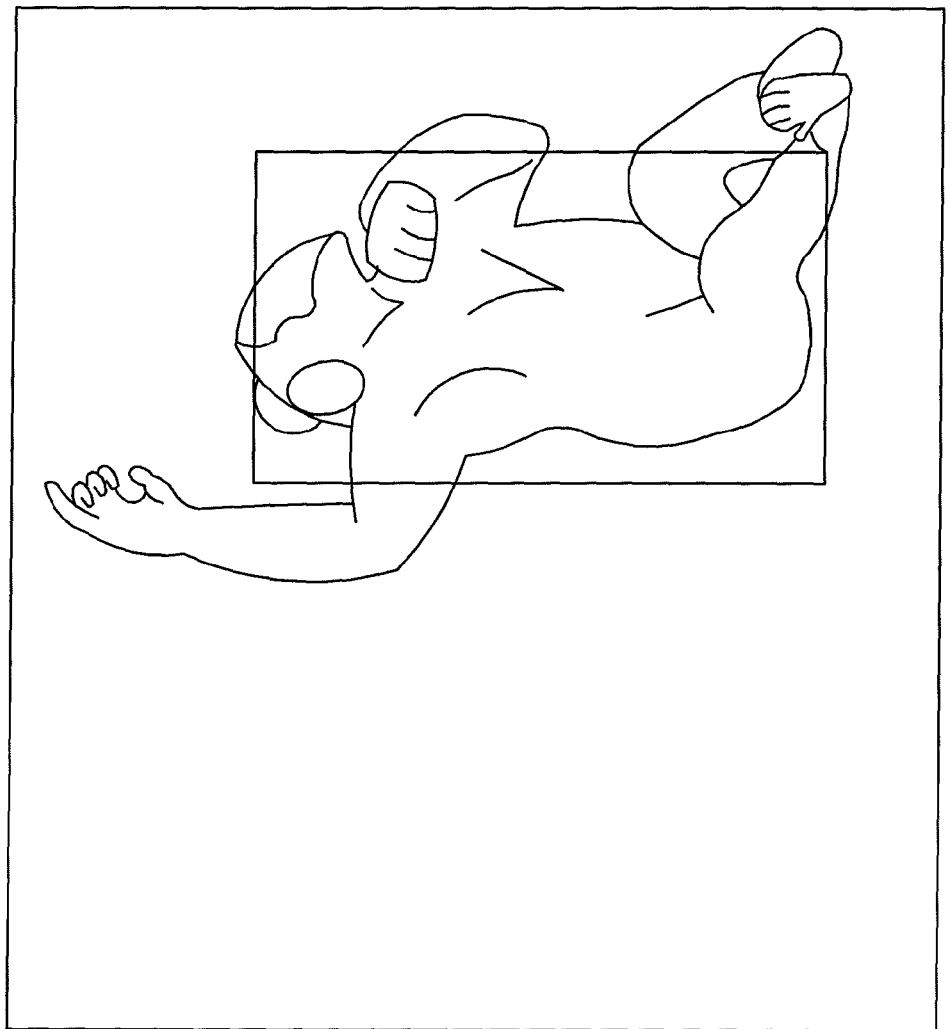

Referring to FIGS. 5-7d, in which FIGS. 5-7d are the first and the second flow charts, the first to fourth schematic views of the second preferred embodiment of the method of detecting subject of image and imaging device thereof of the present invention. Please also refer to FIGS. 1-3d. As shown in the figures, the method of detecting subject of image comprises the following steps:

(S20): providing an image capturing module to capture a temporal image;

(S21): providing an image processing module to receive the temporal image and decide a plurality of objects from the temporal image;

(S22): using the image processing module to calculate a boundary block of each of the objects to represent the object;

(S23): using the image processing module to define a plurality of regions on the temporal image based on a center of the temporal image;

(S24): using the image processing module to assign an initial setup value to each of the boundary blocks according to the region corresponding to each of the boundary blocks;

(S25): using the image processing module to execute an operation to each of the boundary blocks to increase or decrease each of the initial setup values;

(S26): using the image processing module to execute a sorting based on each of the initial setup values after the operation; and (S27): selecting at least one of the objects as the subject of the temporal image based on each of the initial setup values after the sorting.

In the above, the operation step implemented on each of the boundary blocks preferably further comprises the following steps:

(S250): using the image processing module to decrease the initial setup value of the boundary block if a length H2 or a width W2 of the boundary block does not fall in preset ranges of the length or the width;

(S251): using the image processing module to decrease the initial setup value of the boundary block if a first ratio of the length H2 to the width W2 or the width W2 to the length H2 of the boundary block is greater than a first comparison preset value;

(S252): using the image processing module to decide whether a second ratio of a length H2-width W2 multiplication to a pixel value of the boundary block is greater than a second comparison preset value; if the second ratio is greater than the second comparison preset value, the image processing module decreases the initial setup value; and if the second ratio is not greater than the second comparison preset value, the image processing module increases the initial setup value;

(S253): using the image processing module to decrease the initial setup value if the pixel value of the boundary block is close to that of gray, black, white or background pixels of the temporal image;

(S254): using the image processing module to decrease the initial setup value if a size of the boundary block is not within the preset range.

The steps of the method of detecting subject of image of the second preferred embodiment are similar to those of the first preferred embodiment and will not narrate again. However, it is worthy to note that in the second preferred embodiment the image processing module 11 generates a boundary block 201 to include each of the objects 103, used the corresponding boundary block 201 to represent the corresponding object 103, and then assigns an initial setup value 104 to each of the boundary blocks 201 from outside-in. The boundary blocks 201 in the second preferred embodiment are obtained by using a location of every point of the corresponding object 103 in the temporal image 101 to calculate the covariance. This method of calculating the covariance enables the center of the boundary blocks 201 to be the center of all the points of the object 103 and the boundary blocks 201 covers 80% of the area of the object 103. Thus, the boundary blocks are good enough to represent the object in the following calculations.

Afterward, the image processing module 11 implements the above operation steps (S250~S254) over each of the boundary blocks 201 to increase or decrease each of the initial setup values 104 and further executes the sorting of the boundary blocks 201. Finally, the image processing module 11 commands a display module (not shown in the figure) to show the result of disposition to the user for selection. When the user selects one of the boundary blocks 201 with the highest sorting results as the subject of the temporal image 101, a function operation module 12 can use this subject as the focus point to execute focusing, then proceeds to the image capturing of the photographing object. Besides, the selecting subject can also be used in the subsequent auto exposure and the auto white balancing.

In the above, the boundary blocks of this invention can be used to reduce the erroneous selections caused by the shapes of the boundary blocks.

Moreover, the method of detecting subject of image and imaging device thereof of the present invention can be applied to the photographing display interface of a camera before photographing, in focusing, and after photographing; calibrations such as auto focusing, auto white balancing, and auto exposure; and image noise erasion (e.g., darkening the color of the subject).

The present invention has been described with reference to the foregoing preferred embodiments, it will be understood that the invention is not limited to the details thereof. Various equivalent variations and modifications may still occur to those skilled in this art in view of the teachings of the present invention. Thus, all such variations and equivalent modifications are also embraced within the scope of the invention as defined in the appended claims.

What is claimed is:

1. A method of detecting subject of image, comprising the follow steps of:
    providing an image capturing module to capture a temporal image;
    providing an image processing module to receive the temporal image and decide a plurality of objects from the temporal image;
    using the image processing module to define a plurality of regions on the temporal image based on a center of the temporal image;
    using the image processing module to assign an initial setup value to each of the objects according to the region corresponding to each of the objects;
    using the image processing module to execute an operation to each of the objects to increase or decrease each of the initial setup values;
    using the image processing module to execute a sorting based on each of the initial setup values which have already modified by the operation; and
    selecting at least one of the objects as a subject of the temporal image based on each of the initial setup values after the sorting.

2. The method of detecting subject of image of claim 1, wherein the image processing module executes a color block division on the temporal image to obtain a plurality of color blocks, wherein the color block division is irrelevant to a specific color and the plurality of objects are the plurality of color blocks.

3. The method of detecting subject of image of claim 1, wherein the operation comprises the following step of:
    using the image processing module to decrease the initial setup value if a length or a width of the object does not fall in preset ranges of the length or the width.

4. The method of detecting subject of image of claim 3, wherein the operation comprises the following step of:
    using the image processing module to decrease the initial setup value if a first ratio of the length to the width or the width to the length of the object is greater than a first comparison preset value.

5. The method of detecting subject of image of claim 4, wherein the operation comprises the following steps of:
    using the image processing module to decide whether a second ratio of a length-width multiplication to a pixel value of the object is greater than a second comparison preset value;
    if the second ratio is greater than the second comparison preset value, the image processing module decreases the initial setup value; and
    if the second ratio is not greater than the second comparison preset value, the image processing module increases the initial setup value.

6. The method of detecting subject of image of claim 5, wherein the operation comprises the following step of:
    using the image processing module to decrease the initial setup value if the pixel value of the object is close to that of gray, black, white, or background pixels of the temporal image.

7. A imaging device, comprising:
    an image capturing module to capture a temporal image;
    an image processing module to receive the temporal image, to decide a plurality of objects from the temporal image, to define a plurality of regions on the temporal image based on a center of the temporal image, to assign an initial setup value to each of the objects according to the region corresponding to each of the objects, to execute an operation to each of the objects to increase or decrease each of the initial setup values, to execute a sorting based on each of the initial setup values after the operation, to select at least one of the objects as a subject of the temporal image based on each of the initial setup values after the sorting; and a function operation module to execute a function operation of the imaging device based on the subject, wherein the function operation at least comprises a focusing operation.

8. The imaging device of claim 7, wherein the image processing module executes a color block division on the temporal image to obtain a plurality of color blocks, wherein the color block division is irrelevant to a specific color and the plurality of objects are the plurality of color blocks.

9. The imaging device of claim 7, wherein the operation comprises using the image processing module to decrease the initial setup value if a length or a width of the object does not fall in preset ranges of the length or the width.

10. The imaging device of claim 9, wherein the operation comprises using the image processing module to decrease the initial setup value if a first ratio of the length to the width or the width to the length of the object is greater than a first comparison preset value.

11. The imaging device of claim 10, wherein the operation comprises using the image processing module to decide whether a second ratio of a length-width multiplication to a pixel value of the object is greater than a second comparison preset value;

if the second ratio is greater than the second comparison preset value, the image processing module decreases the initial setup value; and if the second ratio is not greater than the second comparison preset value, the image processing module increases the initial setup value.

12. The imaging device of claim 11, wherein the operation comprises using the image processing module to decrease the initial setup value if the pixel value of the object is close to that of gray, black, white, or background pixels of the temporal image.

* * * * *